Feb. 9, 1937. S. F. BRIGGS 2,070,039
FILTER
Filed Dec. 11, 1933 2 Sheets-Sheet 1

Fig. 1.

Inventor
Stephen F. Briggs

Feb. 9, 1937.　　　　S. F. BRIGGS　　　　2,070,039
FILTER
Filed Dec. 11, 1933　　　2 Sheets-Sheet 2

Inventor
Stephen F. Briggs
By DeWitt Jones
Attorney

Patented Feb. 9, 1937

2,070,039

UNITED STATES PATENT OFFICE 2,070,039

FILTER

Stephen F. Briggs, Chenequa, Wis., assignor to Briggs & Stratton Corporation, Milwaukee, Wis., a corporation of Delaware Application December 11, 1933, Serial No. 701,807

7 Claims. (Cl. 210—131)

This invention relates to certain new and useful improvements in oil filters for internal combustion engines, and has as an object to provide improved means for connecting a filter unit with the lubricating system of an engine.

The system with which the present invention is concerned is the commonly used pressure lubricating system of automobile engines in which a force pump is supplied with oil from the crank case sump and the discharge or output of the pump leads to the bearings and also to the inlet of the filter unit. The filter unit is thus connected in parallel with the bearings and also in parallel with a pressure relief valve with which systems of this type are equipped. The relief valve functions in the event the filter unit becomes completely clogged or passage of oil therethrough is impossible for some other reason.

In accordance with this invention, the admission of oil to the filter unit is controlled by a spring pressed valve which, of course, opens at a lower pressure than the pressure relief valve. When the pressure built up by the pump is sufficient to open the spring pressed valve admitting oil to the filter unit, the oil pressure on the bearings drops because of the additional return circuit to the inlet of the pump afforded by the filter unit. When the filter is new, this pressure drop may be enough to deprive the bearings of needed oil unless the opening to the filter is restricted.

In the past, a fixed orifice of small capacity provided the inlet to the filter to insure the bearings receiving the proper supply of oil when the filtering element was new or became punctured. However, as the filtering element clogs up, its resistance to the flow of oil therethrough increases so that the pressure before, or ahead, of the filtering element, which may be termed "back pressure", likewise rises. This increases the pressure on the bearings and consequently the supply of oil to the bearings with the result that the flow of oil through the filter is lessened and the usefulness of the filter rapidly decreases.

With the above objection to the existing practice in mind, it is another object of this invention to provide novel means for connecting the filter unit with the lubricating system in such a manner that the supply of oil to the filter is metered according to the magnitude of the resistance or back pressure of the filter so as to keep the pressure on the bearings substantially constant and thereby not minimize the amount of oil passing through the filter unit.

More specifically, it is an object of this invention to provide a valve mechanism for connecting a filter unit with a pressure lubricating system, adapted to open and establish an initially small communication between the filter unit and the lubricating system upon the pressure exceeding a predetermined degree, and having means to automatically increase the degree of communication in response to a rising resistance of back pressure created ahead of the filter unit as dirt accumulates therein.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a view partly in side elevation and partly broken away and in section showing a filter unit equipped with the improved valve mechanism of this invention;

Figure 3:
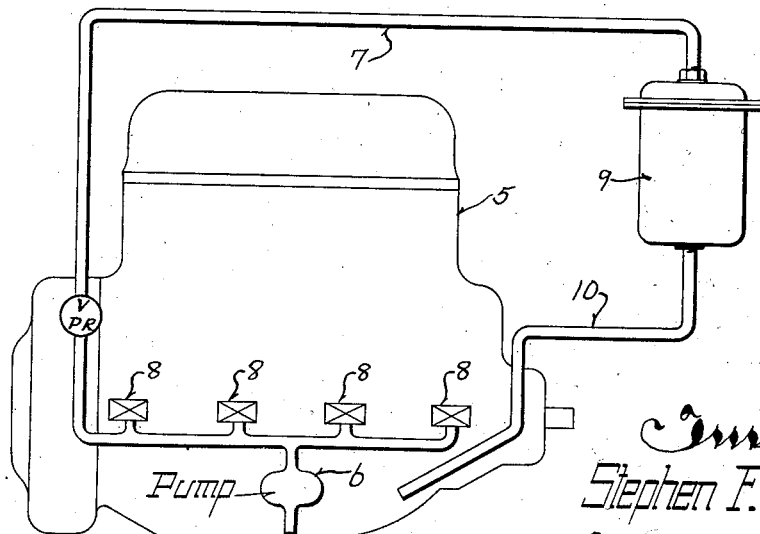
Figure 3 is a diagrammatic view illustrating the manner of connecting the filter unit of this invention with the pressure lubricating system of an internal combustion engine.

Referring now more particularly to the accompanying drawings in which like numerals indicate like parts throughout the several views, and particularly to Figure 3, the numeral 5 designates a conventional internal combustion engine equipped with a pressure lubricating system illustrated diagrammatically as comprising a force pump 6 arranged to take oil from the crank case of the engine and force it out through a circulatory system 7. The main pressure feed line of the circulatory system 7 has a pressure relief valve 4 connected therein and connects with branch ducts leading to the various bearings 8. It also connects with the inlet of a filter unit designated generally by the numeral 9 through the novel valve mechanism forming the subject matter of this invention. After passing through the filter unit, the oil is returned to the crank case through a duct 10.

The filter unit 9 may be of any desired design or construction and in the embodiment illustrated in Figure 1, comprises an outer shell 11 having an integral bottom 12 and a removable cover 13. Disposed within the shell 12, is a removable filter core or cartridge 14, shown in the present instance as comprising a mass of fibrous material contained within an inner shell 15. To preclude the oil trickling down along the inner wall of the shell 15, the fibrous material is preferably cemented to the inner surface of the shell 15. The open top of the shell 15 is closed by a foraminous screen 16, to retain the fibrous material in place and provide access to the filter material.

Attached to the bottom wall of the outer shell is the valve mechanism for connecting the filter unit in the lubricating system. It comprises a body 17 having two spaced vertical bores 18 and 19 opening to its top and communicated with inlet and outlet ports 20 and 21 respectively, by which the unit is connected in the system. The communication between the inlet port 20 and the bore 18 is normally interrupted by a yieldably held valve 22 to normally close off communication between the inlet port 20 and the interior of the outer shell with which the bore 18 communicates. The outlet port 21 is at all times in communication with the bore 19.

At its upper inner end the bore 19 is counterbored to receive a cork gasket 23. Engaging the cork gasket is a flanged outlet opening 24 leading from the interior of the filter cartridge so that the interior of the filter cartridge is at all times in direct communication with the outlet port 21.

The valve 22 is slidable in a bore 25 which intersects the bore 18 and communicates at one end with a smaller bore 26 communicating with the inlet port 20, and its other end with a larger bore 27 which intersects the bore 19 and has its outer open end internally threaded.

The shoulder afforded by the juncture of the bores 25 and 26 provides a valve seat with which the forward end of the valve 22 is yieldably engaged by a compression spring 28. The spring 28 has one end seated in a drilled recess in the valve and its other end engages an adjustable stop 29 threaded in the outer open end of the bore 27. The extreme outer end of the threaded bore 27 is preferably closed by a plug 30.

That end of the valve member 22 which is disposed within the bore 27, carries a flange 31, which has a snug fit in the bore 27 to act as a piston and is so located with respect to the juncture between the bores 25 and 27 that when the valve is closed, as shown, a space is left between the flange and the inner end of the bore 27. Leading to this space and communicating it with the interior of the outer shell 11, is a port 32.

The spring stop 29 is adjusted so that the spring 28 holds the valve 22 closed until a predetermined pressure has been built up within the lubricating system, which, however, is less than that at which the pressure relief valve 4 opens, whereupon the valve 22 is opened against the action of the spring, permitting the flow of lubricant into the filter unit and through the same, to be discharged back into the crank case.

After the system has been at rest for a short period, whatever pressure there may have been on the outlet side of the filter will have been relieved by drainage of the oil into the crank case sump through the outlet 21. The pressure in the chamber around the outside of the filter mass also will have been relieved through seepage through the filter. The pressure in the bore 18 is accordingly zero.

When the system again becomes active, the operation of the oil pump increases the pressure in the inlet 20, which pressure builds up to the predetermined value necessary to open the valve 22.

Immediately upon opening of the valve 22, the pressure in the inlet 20 is partially relieved so that the valve has a tendency to return to its seat or to flutter. If the filter interposes little resistance to the oil flow therethrough so that pressure is built up in the outlet bore 19, the effect of the pressure at the outlet on the opposite end of the valve will aggravate the tendency of the valve to flutter.

Ordinarily, however, and particularly after the filter has been in use for some period of time and contains a considerable amount of dirt, there is not much outlet pressure and the flow of oil through the outlet may be a mere trickle.

The tendency of the valve to flutter is overcome in the present invention by the provision of the port 32 and the piston flange 31 operating in the cylinder 27. Through the port 32 the pressure at the inlet side of the filter is imposed on the piston 31 so that the drop in pressure on the end of the valve 22 resulting from its opening is compensated for.

When the filter cartridge is fresh, the amount of back pressure created thereby is slight, but after it has been in use a while and dirt and foreign matter accumulates therein, the back pressure increases. This back pressure ordinarily would have the same effect upon the valve 22 as increasing the strength of the spring 28 so that the valve would not open at the predetermined pressure. Hence, in the conventional filter, the period of usefulness of the cartridge is short.

The present invention entirely nullifies this objectionable effect of back pressure on the valve and accomplishes this purpose by the communication of the interior of the outer shell with the space between the piston flange 31 and the inner end of the bore 27 through the port 32. Inasmuch as the outer face of the flange 31 is not subjected to the back pressure, by applying the fluid pressure of the interior of the outer shell on the flange 31, the effect of the back pressure on the valve is entirely nullified so that the only force holding the valve closed is that of the spring 28 plus the slight pressure at the outlet of the filter. The pressure on the piston flange 31 obviously increases as the filter becomes clogged and the resistance to the flow of oil therethrough increases. Consequently, regardless of the amount of back pressure built up within the outer shell, the valve 22 will open at the predetermined pressure to which the spring 28 is set.

It is also to be observed that upon the opening of the valve 22 the pressure on the bearings drops by virtue of the fact that an additional return to the inlet of the pump is provided. To preclude too great a drop in oil pressure at the bearings and the possibility of inadequate lubrication, the spring 28 is of such strength that the initial opening of the valve 22 is comparatively slight.

When the filter unit is new, a slight opening of the valve 22 admits sufficient oil for efficient filtering, but as the filter unit clogs up with dirt, its increasing resistance to the flow of oil therethrough creates a back pressure ahead of the filter unit with the result that the oil pressure on the bearings is increased and the flow of oil through the filter unit is materially decreased unless the inlet passage to the filter unit is augmented.

The valve mechanism of the present invention does this in the following manner. Through the communication afforded by the port 32, the back pressure ahead of the filter unit is imposed upon the flange 31 so that as the back pressure and the resistance to the flow of oil through the filter unit rises, the valve 22 is opened further. In other words, the flow of oil to the filter unit is metered according to the resistance of the filter unit to the flow of oil therethrough. By opening the valve 22 further, the resistance to the flow of oil into the filter unit is lowered thus keeping up the flow of oil through the filter and maintaining the filter action with as little hindrance as possible until the filter is completely clogged. Hence, the effective life of the filter is materially increased.

Figure 2:
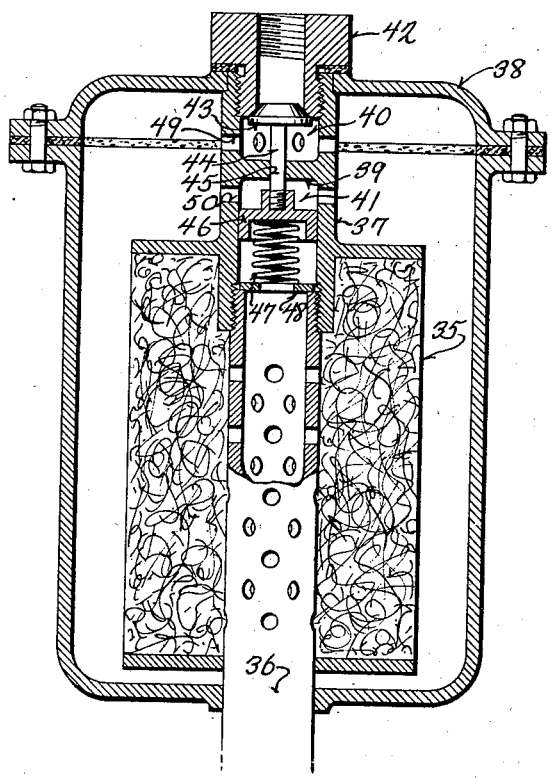
Figure 2 is a view similar to Figure 1 illustrating a modified embodiment of the invention.

The valve mechanism of this invention may be modified, if desired, as shown in Figure 2. In this embodiment of the invention, the filter cartridge 35 is mounted on a central perforated tube 36, the lower end of which connects to the return duct 10. The valve mechanism is mounted on the upper end of the central tube 36 and comprises a tubular body 37 attached to the upper end of the tube and extending upwardly to project through the cover 38 of the outer shell. A partition 39 divides the tubular body into upper and lower chambers 40 and 41 respectively.

Threaded into the outer end of the upper chamber 40 is a nipple 42, which also serves to hold the body portion 37 assembled with the cover 38. The nipple 42 is internally threaded for the attachment of the intake tube leading from the system 7. The lower end of the nipple 42 provides a valve seat with which a valve 43 engages. The valve 43 is mounted on a stem 44, which is slidably received in a bore 45 in the partition wall 39. Beneath the partition wall and within the lower chamber 41, the valve stem has a piston 46 attached to it to bear against an expansive spring 47 confined between the piston and a washer 48 resting on the upper end of the central tube 36. The spring 47 corresponds to the spring 28 in the embodiment shown in Figure 1 and yieldably maintains the valve 43 closed.

When the predetermined pressure is attained within the lubricating system, the valve 43 is opened against the action of the spring 47 permitting the flow of oil into the interior of the filter unit through ports 49 leading from the upper chamber 40.

The lower chamber 41 is also communicated with the interior of the filter unit through ports 50 so that as the back pressure builds up within the filter unit, its action on the piston 46 has the effect of weakening the spring 47.

From the foregoing description taken in connection with the accompanying drawings, it will be readily apparent to those skilled in the art that this invention provides controlled communication between a pressure lubricating system and a filter unit whereby the supply of oil to the filter is metered according to the resistance of the filter to the passage of oil therethrough in such a manner as to keep the pressure on the bearings substantially constant and the flow of oil through the filter substantially undiminished for a long period of time.

What I claim as my invention is:

1. In combination with a pressure lubricating system, a filter unit including an inlet chamber, a filter mass and an outlet chamber, means to communicate the inlet chamber of the filter unit with the system including a valve, yieldable means to hold the valve closed, said yieldable means being opposed by the pressure of the system and yielding to permit opening of the valve when the pressure within the system exceeds a predetermined value, and means responsive to back pressure created within the inlet chamber of the filter unit to weaken the effect of said yieldable means on the valve and open the valve farther as the back pressure builds up.

2. In combination with a pressure lubricating system, a filter unit including an inlet chamber, a filter mass and an outlet chamber, means to connect the filter unit with the system including a valve controlling communication between the inlet chamber and the system and adapted to open when the pressure within the system exceeds a predetermined value, a piston connected with the valve, a cylinder in which the piston operates communicated with the inlet chamber of the filter unit whereby the piston is acted upon by back pressure created within said inlet chamber by the retardation of flow through the filter mass, and a spring to oppose the movement of the valve by the pressure of the system and the back pressure.

3. In a filter device including a housing to receive fluid to be filtered, said housing having an inlet for unfiltered fluid and an outlet for filtered fluid, a valve to close said inlet and operable by fluid pressure, a spring to hold said valve closed and to determine the pressure at which the valve opens, a cylinder communicated with the interior of the housing, and a piston connected with the valve and movable in the cylinder to be acted upon at one side by back pressure created within the housing and at its other side by pressure at the outlet of the filter unit, so that the greater back pressure has the effect of weakening the spring to the extent necessary to overcome the effect of back pressure on the valve and insure the opening of the valve in response to the predetermined fluid pressure.

4. In combination with a pressure lubricating system, a filter unit having an inlet and an outlet, means to communicate the inlet and outlet with the system, means normally closing the inlet and responsive to a predetermined pressure differential at the inlet and outlet to open and connect the inlet of the filter unit with the system, the opening of said means to connect the filter unit with the system altering said pressure differential by an amount varying with the condition of the filter, and pressure equalizing means to compensate for said varying pressure differential.

5. In combination with a pressure lubricating system, a filter unit having an inlet and an outlet, means to connect the inlet and outlet of the filter unit with the system, a valve normally closing the inlet and responsive to a predetermined pressure differential at the inlet and outlet of the filter unit to open and connect the inlet of the unit with the system, and means connected with said valve and operable by back pressure built up at the inlet of the filter unit for increasing the force actuating said valve.

6. In combination with a pressure lubricating system, a filter unit having an inlet and an outlet, means to connect the filter unit with the system including a valve normally closing the inlet, yieldable means to hold the valve closed, said yieldable means being opposed by the pressure of the system and yielding to enable opening of the valve when the pressure within the system exceeds a predetermined value, ducts connecting opposite pressure responsive surfaces of said valve with the inlet and the outlet of the filter upon opening of said valve, and means responsive to back pressure created within the duct at the inlet by the filter unit to weaken the effect of the yieldable means on the valve to insure opening of the valve upon the attainment of said predetermined pressure within the system regardless of the degree of back pressure.

7. In combination with a pressure lubricating system, a filter unit having an inlet and an outlet, means to connect the filter unit with the system including a valve normally closing the inlet and responsive to pressure within the system to be opened thereby, a spring to oppose the opening of the valve, said spring being set to determine the pressure at which the valve opens, said valve having a surface acted on by pressure at the outlet of said filter unit, and means connected with the valve and acted upon by pressure at the inlet of the filter unit inwardly of said valve to overbalance the pressure at the outlet of the filter.

STEPHEN F. BRIGGS.